(12) United States Patent
Kim et al.

(10) Patent No.: US 10,381,697 B2
(45) Date of Patent: Aug. 13, 2019

(54) METAL-AIR BATTERY INCLUDING CATHODE WITH AIR PATH

(71) Applicant: Samsung Electronics Co., Ltd., Suwon-si, Gyeonggi-do (KR)

(72) Inventors: Hyunjin Kim, Seoul (KR); Mokwon Kim, Suwon-si (KR); Joonhee Kim, Seoul (KR); Hyunpyo Lee, Seoul (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 170 days.

(21) Appl. No.: 15/679,240

(22) Filed: Aug. 17, 2017

(65) Prior Publication Data

US 2018/0301777 A1 Oct. 18, 2018

(30) Foreign Application Priority Data

Apr. 12, 2017 (KR) ........................ 10-2017-0047588

(51) Int. Cl.
*H01M 12/06* (2006.01)
*H01M 4/38* (2006.01)
*H01M 4/86* (2006.01)
*H01M 12/08* (2006.01)
*H01M 4/02* (2006.01)

(52) U.S. Cl.
CPC ......... *H01M 12/065* (2013.01); *H01M 4/382* (2013.01); *H01M 4/8626* (2013.01); *H01M 12/06* (2013.01); *H01M 12/08* (2013.01); *H01M 2004/025* (2013.01); *Y02E 60/128* (2013.01)

(58) Field of Classification Search
CPC ... H01M 4/8626; H01M 12/06; H01M 12/065
USPC ......................................................... 429/405
See application file for complete search history.

(56) References Cited

U.S. PATENT DOCUMENTS

2015/0010845 A1\* 1/2015 Matter ................ H01M 8/2455
429/471
2016/0064788 A1 3/2016 Koido et al.

FOREIGN PATENT DOCUMENTS

| JP | 2013058336 A | 3/2013 |
|----|--------------|--------|
| JP | 2013216503 A | 10/2013 |
| JP | 201651705 A | 4/2016 |
| KR | 1020150020388 A | 2/2015 |

\* cited by examiner

*Primary Examiner* — Basia A Ridley
*Assistant Examiner* — James M Erwin
(74) *Attorney, Agent, or Firm* — Cantor Colburn LLP

(57) ABSTRACT

Provided is a metal-air battery including a cathode having an air path. The metal-air battery includes a plurality of folded cells stacked in a direction, and each of the folded cells includes: an anode having a U-shape defined by first and second portions separated from and parallel to each other, and a side portion which connects the first and the second portions to each other; an anode protection film arranged on an inner surface of the anode; and a first cathode and a second cathode on the anode protection film, the first cathode and the second cathode arranged facing each other between the first portion and the second portion of the anode. The first cathode and the second cathode each includes a base which contacts the anode protection film, and a plurality of protrusion units extended from the base.

20 Claims, 4 Drawing Sheets

METAL-AIR BATTERY INCLUDING CATHODE WITH AIR PATH

CROSS-REFERENCE TO RELATED APPLICATION

This application claims priority to Korean Patent Application No. 10-2017-0047588, filed on Apr. 12, 2017, and all the benefits accruing therefrom under 35 U.S.C. § 119, the content of which in its entirety is herein incorporated by reference.

BACKGROUND

1. Field

The present disclosure relates to metal-air batteries including a cathode with an air path.

2. Description of the Related Art

A metal-air battery includes an anode that can store/release ions and a cathode that uses oxygen in the air as an active material. A reduction/oxidation of oxygen entering from the outside occurs in the cathode and an oxidation/reduction of a metal occurs in the anode of the metal-air battery, and chemical energy generated in this process is used as electrical energy. For example, when the metal-air battery is discharged, it absorbs oxygen, and when the metal-air battery is charged, it emits oxygen. In this way, since the metal-air batteries use oxygen in the air, they may have increased energy density. For example, the metal-air battery may have an energy density a few times greater than that of a lithium ion battery of the related art.

Also, the metal-air batteries have outstanding safety since they have a low chance of igniting due to an abnormally high temperature. Also, the metal-air batteries have a low chance of causing environmental contamination since the metal-air batteries are operated by storing/releasing oxygen, without requiring the use of a heavy metal.

SUMMARY

Provided is a metal-air battery including a cathode having an air path instead of a gas diffusion layer.

Additional features will be set forth in part in the description which follows and, in part, will be apparent from the description, or may be learned by practice of the presented embodiments.

According to an embodiment, a metal-air battery includes: an anode having a U-shape defined by first and second portions separated from and parallel to each other, and a side portion which connects the first and the second portions to each other; an anode protection film arranged on an inner surface of the anode; and a first cathode and a second cathode on the anode protection film, the first cathode and the second cathode arranged facing each other between the first portion and the second portion of the anode. The first cathode and the second cathode each includes a base which contacts the anode protection film, and a plurality of protrusion units extended from the base.

According to another embodiment, a metal-air battery includes: a plurality of folded cells consecutively stacked. Each of the folded cells includes: an anode having a U-shape defined by first and second portions separated from and parallel to each other, and a side portion which connects the first and the second portions to each other; an anode protection film arranged on an inner surface of the anode; and a first cathode and a second cathode on the anode protection film, the first cathode and the second cathode arranged facing each other between the first portion and the second portion of the anode. The first cathode and the second cathode each respectively includes a base which contacts the anode protection film, and a plurality of protrusion units extended from the base.

The protrusion units of the first cathode may contact the protrusion units of the second cathode.

The plurality of protrusion units may have the same shape as one another.

The protrusion units may have a circular column shape.

The protrusion units may be arranged spaced apart from each other by a gap, and in a direction in which the protrusion units are arranged spaced apart from each other, a width of the protrusion units may be greater than the gap.

The protrusion units may have a stripe shape. The protrusion units having the stripe shape may be arranged spaced apart from and parallel to each other by a gap, the gap exposed to outside the metal-air battery to form an air inlet for external air.

Within each of the plurality of folded cells, the first cathode and the second cathode may each extend further than the anode and the anode protection film to define a respective extension unit disposed outside the anode and the anode protection film. The metal-air battery may further include a cathode current collector which connects the extension units to each other.

The anodes of the plurality of folded cells may be connected to each other to form a single anode having a serpentine shape, the serpentine shape defining: a plurality of opening spaces respectively between the first and second portions parallel to each other, the opening spaces being open at a same first side of the single anode, and bent portions at a second side of the single anode opposite to the first side thereof, and the anode protection films of the plurality of folded cells may be connected to each other to form a single anode protection film consecutively formed along an inner surface of the single anode at the opening spaces thereof.

The first cathode and the second cathode of the plurality of folded cells are connected to each other to form a third cathode having a serpentine shape on the single anode protection film, and the third cathode is exposed outside the single anode and the anode protection film, at the first side of the single anode.

The metal-air battery may further include a cathode current collector disposed at the first side of the single anode, the cathode current collector extending across the opening spaces of the single anode to contact the third cathode at the first side of the single anode.

The metal-air battery may further include an anode current collector disposed at the second side of the single anode, the anode current collector extending across the bent portions of the single anode to contact the bent portions of the single anode at the second side thereof.

The cathode current collector and the anode current collector may be arranged to face each other, with the plurality of folded cells therebetween.

The third cathode, the single anode and the anode protection film may be exposed outside the metal-air battery at a front surface thereof. The metal-air battery may further include a covering material which surrounds the cathode current collector, the anode current collector and external surfaces of the plurality of folded cells except for the front surface of the metal-air battery.

The anode protection film may include a polymer electrolyte film having conductivity with respect to metal ions while blocking oxygen.

BRIEF DESCRIPTION OF THE DRAWINGS

These features will become apparent and more readily appreciated from the following description of the embodiments, taken in conjunction with the accompanying drawings in which.

DETAILED DESCRIPTION

Figure 1:
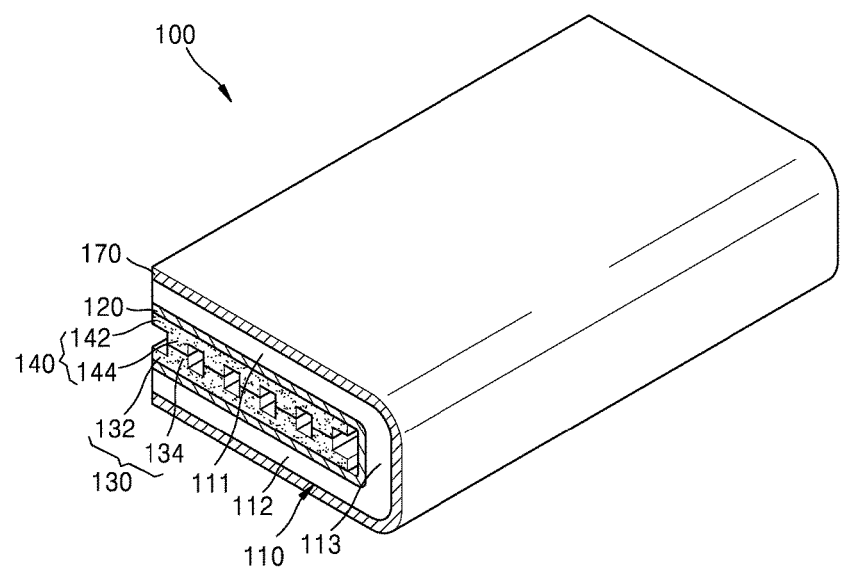
FIG. 1 is a schematic perspective view of a structure of a metal-air battery having a foldable structure according to an example embodiment.

Reference will now be made in detail to embodiments, examples of which are illustrated in the accompanying drawings. In the drawings, thicknesses of layers and regions may be exaggerated for clarity of layers and regions. The example embodiments of the inventive concept are capable of various modifications and may be embodied in many different forms.

It will be understood that when an element or layer is referred to as being related to another element such as being "formed on" or "above" another element or layer, it may include directly or indirectly formed on the other element or layer. In contrast, when an element or layer is referred to as being related to another element such as being "directly formed on" or "directly above" another element or layer, there are no intervening layers therebetween.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A metal-air battery may include a gas diffusion layer for supplying oxygen. However, the gas diffusion layer may undesirably increase the weight of the metal-air battery, and accordingly, the gas diffusion layer may be an obstacle to manufacture a metal-air battery having relatively high energy density.

FIG. 1 is a schematic perspective view of a structure of a metal-air battery 100 having a foldable structure, according to an example embodiment.

The folded metal-air battery 100 may have a relative long side extended in a first direction and a relatively short size extended in a second direction which crosses the first direction. A thickness of the metal-air battery 100 may extend in a third direction which crosses both the first and second directions. Inner elements of the metal-air battery 100 may be exposed to outside the metal-air battery 100 at one or more sides thereof. An air inlet for the metal-air battery may be formed at the side where the inner elements are exposed.

Referring to FIG. 1, the metal-air battery 100 may include a U-shape anode 110. With the metal-air battery 100 folded, the anode 110 includes an upper portion 111, a lower portion 112, and a side portion 113 that connects the upper portion 111 and the lower portion 112 to each other. The upper portion 111 and the lower portion 112 are spaced apart from each other and disposed in parallel to each other, and may be respectively referred to as a first portion and a second portion of the overall anode 110.

With the metal-air battery 100 and the anode 110 folded, a space is formed in an inner portion of the anode 110, between the upper and lower portions 111 and 112 facing each other. An anode protection film 120 may be arranged in this space. A first cathode 130 and a second cathode 140 may be arranged on an inner face of the anode protection film 120 to face each other at the space. The first cathode 130 may be arranged on the lower part 112 of the anode 110, and the second cathode 140 may be arranged on the upper portion 111 of the anode 110.

The first cathode 130 includes a base 132 that contacts the anode protection film 120, and a first protrusion unit 134 provided in plurality spaced apart from each other on the base 132. The first protrusion units 134 may each extend from a common surface of the base 132. In an example embodiment of manufacturing the metal-air battery, the first protrusion units 134 may be formed by patterning a surface of a cathode material layer. The first protrusion units 134 and the base 132 may be formed as one body. One of the base 132 and the first protrusion units 134 may extend to define the other one of the base 132 and the first protrusion units 134.

The second cathode 140 includes a base 142 that contacts the anode protection film 120, and a second protrusion unit 144 provided in plurality spaced apart from each other on the base 142. The second protrusion units 144 may each extend from a common surface of the base 142. In an example embodiment of manufacturing the metal-air battery, the second protrusion units 144 may be formed by patterning a surface of a cathode material layer. The second protrusion units 144 and the base 142 may be formed as one body. One of the base 142 and the first protrusion units 144 may extend to define the other one of the base 142 and the first protrusion units 144.

The first protrusion units 134 and the second protrusion units 144 may be arranged to contact and face each other. Distal ends of the first protrusion units 134 and the second protrusion units 144 may be arranged to contact and face each other.

With the first protrusion units 134 and the second protrusion units 144 in contact with each other, a gap is formed between the first and second cathodes 130 and 140. Spaces between first protrusion units 134 face spaces between second protrusion units 144 to form the gap. Air may enter from outside the metal-air battery 100 through the gap formed between the first and second protrusion units 134 and 144. That is, an air path is formed between the first and second protrusion units 134 and 144 and the bases 132 and 142. A collection of gaps between the first and second cathodes 130 and 140 may form an overall air path of the metal-air battery 100.

In FIG. 1, for convenience, it is depicted that the first protrusion units 134 and the second protrusion units 144 are aligned to face each other. However, the current example embodiment is not limited thereto. In an alternative embodiment, for example, with the metal-air battery 100 folded, the second protrusion units 144 may be arranged in a zigzag formation with respect to the first protrusion units 134, such as along a short side at a front surface of the metal-air battery 100 shown in FIG. 1. In FIG. 1, inner elements of the anode 110, the anode protection film 120, and the first and second cathodes 130 and 140 with gaps therebetween are exposed at a front side of the metal-air battery 100, such as to form an air inlet thereof.

In FIG. 1, the first cathode 130 and the second cathode 140 are formed or provided separately from each other. However, the current example embodiment is not limited thereto. In an alternative embodiment, for example, the first cathode 130 and the second cathode 140 may be connected to each other on an inner surface of the folded anode protection film 120.

An anode current collector 170 may be further formed on an external surface of the anode 110. The anode current collector 170 may be disposed or formed along an entirety of the external surface of the anode 110 or only on a portion of the surface of the anode 110. The anode current collector 170 may include copper. The anode current collector 170 may define an outer surface of the metal-air battery 100.

The anode 110 plays a role of storing/releasing metal ions of, for example, Li, Na, Zn, K, Ca, Mg, Fe, Al, Cu, an alloy of these metals, or a stack of these metals in more than two layers.

The anode protection film 120 may include a flexible polymer electrolyte membrane that reduces or effectively prevents the penetration of oxygen and has conductivity with respect to metal ions. In an embodiment, for example, the anode protection film 120 may include a polymer fabric, such as a polypropylene material fabric or a polyphenylene sulfide material fabric, or a porous film of an olefin group resin, such as polyethylene or polypropylene.

The anode protection film 120 includes an electrolyte that transmits metal ions from the anode 110, to each of the first cathode 130 and the second cathode 140, and a solvent that dissolves the electrolyte. In an example embodiment of manufacturing the metal-air battery, the electrolyte may be formed by dissolving a metal salt in the solvent. The electrolyte may be a polymer electrolyte, an inorganic electrolyte, or a composite electrolyte formed by combining the polymer electrolyte and the inorganic electrolyte. The electrolyte may be in a solid state. In an embodiment, for example, the metal salt may include a lithium salt, such as $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, or LiTFSI (lithium bis(trifluoromethanesulfonyl)imide), and another metal salt, such as $AlCl_3$, $MgCl_2$, NaCl, KCl, NaBr, KBr, or $CaCl_2$, may further be added to the above lithium salts.

The solvent may be any type of solvent that may dissolve the lithium salts and the metal salts.

In an example embodiment of manufacturing the metal-air battery, the anode protection film 120 may be formed as a layer by impregnating the electrolyte in a porous film. In an embodiment, for example, an electrolyte formed by combining polyethylene oxide ("PEO") and LiTFSI may be impregnated in pores of the porous film.

The first cathode 130 and the second cathode 140 may include an electrolyte for conducting metal ions, a catalyst for oxidation/reduction of oxygen, a conductive material, and a binder. The electrolyte may be the same material used in the anode protection film 120. In an example embodiment of manufacturing the metal-air battery, after combining the electrolyte, the catalyst, the conductive material and the binder, a cathode slurry is formed by combining a solvent into the combined materials. A cathode material layer may be formed by coating and drying the cathode slurry on the anode protection film 120. The first cathode 130 and the second cathode 140 may be formed by patterning a surface of the cathode material layer.

The conductive material may be a porous carbon group material, a conductive metal material, a conductive organic material, or a combination of these materials. In an embodiment, for example, the carbon group material may include carbon black, graphite, graphene, activated charcoal, carbon fiber, carbon nanotube ("CNT"), etc., and the conductive metal material may be used, for example, in a metal powder state.

The catalyst may be, for example, Pt, Au, or Ag, or may be an oxide of a metal, such as, Mn, Ni, or Co.

The binder may include polytetrafluoroethylene ("PTFE"), polypropylene, polyvinylidene difluoride ("PVDF"), polyethylene, or styrene-butadiene rubber.

Figure 2:
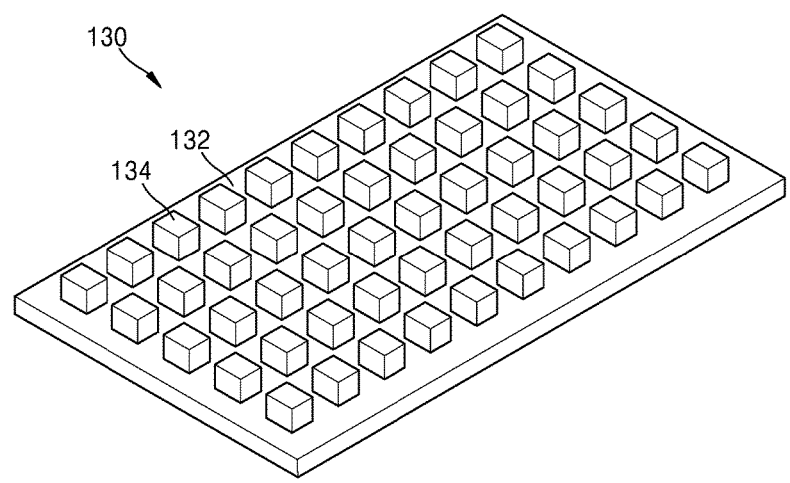
FIG. 2 is a perspective view of a structure of a cathode of FIG. 1 according to an example embodiment.

FIG. 2 is a perspective view of a structure of a cathode of FIG. 1 according to an example embodiment. The cathode of FIG. 2 may be the first cathode 130 and/or the second cathode 140.

Referring to FIG. 2, the first cathode 130 includes a plurality of the first protrusion units 134 extended from a common base 132. In an example embodiment of manufacturing the metal-air battery, the first protrusion units 134 may be formed by performing a patterning process on a surface of the cathode material layer. The first protrusion units 134 may have the same shape as one another. The first protrusion units 134 may have a rectangular column shape, but the current example embodiment is not limited thereto. In an alternative embodiment, for example, the first protrusion units 134 may have a circular column shape, a polygonal column shape, or a pyramid shape.

The first cathode 130 may be disposed in a plane parallel to that defined by the first and second directions. The first protrusion units 134 may be arranged spaced apart from each other in the first and/or second directions. A width (a side or a diameter) of the first protrusion units 134 in the first or second direction, may be in a range from about 10 micrometers (μm) to about 20 μm. In the arrangement direction of the first protrusion units 134, gaps between the first protrusion units 134 may be smaller than the width thereof. The gaps between the first protrusion units 134 may be approximately ⅔ of the width thereof. In an embodiment, for example, the gaps between the first protrusion units 134 may be in a range from about 7 μm to about 14 μm.

Referring to FIG. 2, in a (third) direction from the base 132 to the distal ends of the first protrusion units 134, the first protrusion units 134 may have a height in a range of ½ to 1 times the thickness of the base 132.

The metal-air battery 100 according to the example embodiment may readily supply oxygen to the first cathode 130 and the second cathode 140 through the air path formed between the protrusion units 134 and 144 and the bases 132 and 134 of the first cathode 130 and the second cathode 140, without using a gas diffusion layer. Accordingly, since the metal-air battery 100 according to the example embodiment does not use a gas diffusion layer, the weight of the metal-air battery 100 is reduced, thereby increasing energy density of the metal-air battery 100.

Figure 3A:
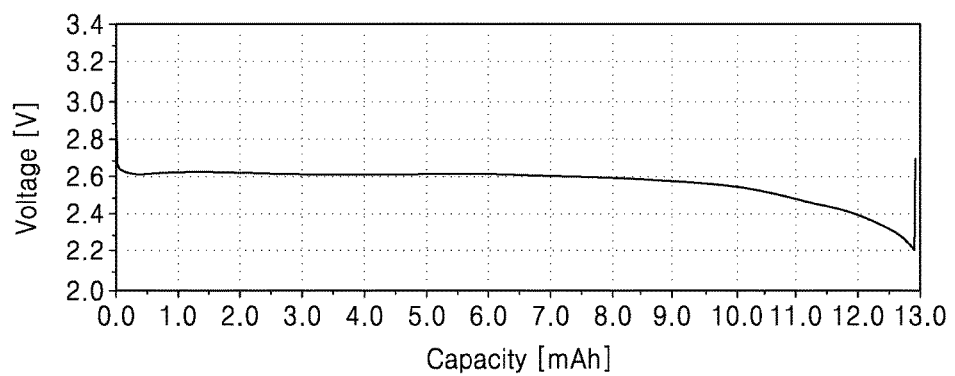
FIG. 3A is a graph showing discharge performance of a metal-air battery having a foldable structure.
Figure 3B:
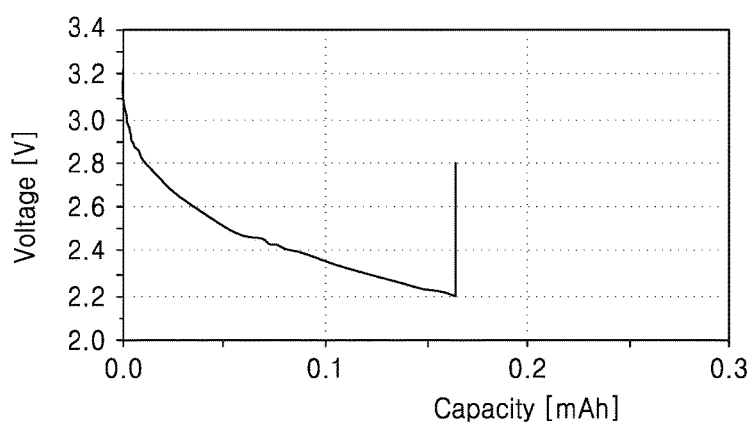
FIG. 3B is a graph showing discharge performance of a metal-air battery that does not include a patterned protrusion unit.

FIG. 3A is a graph showing a discharge performance of the metal-air battery 100 having a foldable structure including a patterned protrusion unit according to an embodiment. FIG. 3B is a graph showing a discharge performance of the metal-air battery 100 that does not include a patterned protrusion unit. The performance test was stopped when an output voltage reduced to 2.2 volts (V). An anode current collector was formed of Cu, an anode was formed of Li, an anode protection film was formed by combining CNT: electrolyte:PTFE in a weight ratio of 1:3:0.2. A cathode was formed of CNT. Referring to FIG. 3B, since the metal-air battery did not include a patterned protrusion unit of the cathode, air was not smoothly supplied to the cathode, cell performance was barely realized.

Referring to FIG. 3A, a battery performance of 2,200 milliamp hours per gram (mAh/g) carbon was realized without using a gas diffusion layer. Since the metal-air battery 100 did include a patterned protrusion unit of the cathode, external air was smoothly supplied to the cathode through an air path formed by the patterned protrusion units formed at a surface of the cathode.

Figure 4:
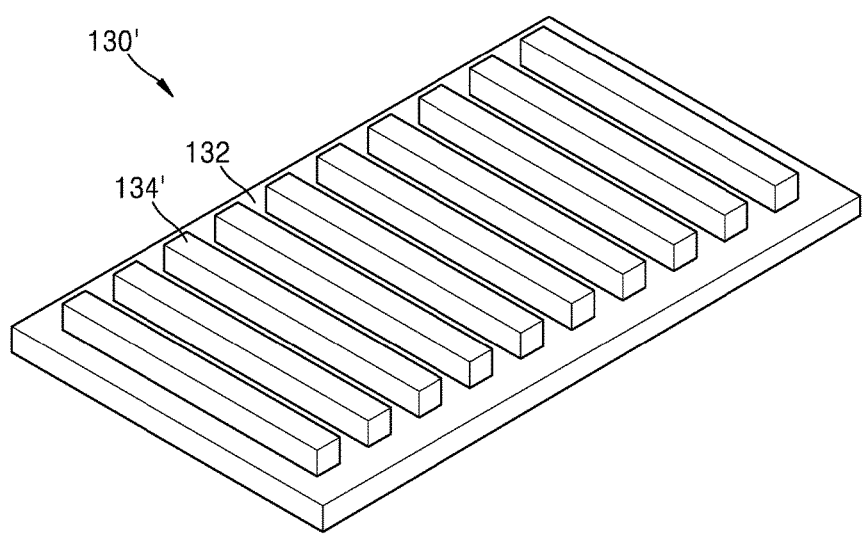
FIG. 4 is a perspective view of a structure of an cathode according to another example embodiment.

FIG. 4 is a perspective view of a structure of a cathode according to another example embodiment. The cathode in FIG. 4 may be a first cathode 130' and/or the second cathode 140.

Referring to FIG. 4, the first cathode 130' may include a protrusion unit 134' provided in plurality spaced apart from each other on the base 132. The protrusion units 134' may have a stripe form. The protrusion units 134' define a length thereof (extended along the relatively short side of first cathode 130' in FIG. 4) greater than a width thereof (extended along the relatively long side of first cathode 130' in FIG. 4). The protrusion units 134' may have a width in a range of about 10 μm to about 20 μm. Gaps between the protrusion units 134' in an arrangement direction thereof may be smaller than the width thereof. The gaps between the protrusion units 134' may be approximately ⅔ of the width. In an embodiment, for example, the gaps between the protrusion units 134' may be in a range from about 7 μm to about 14 μm. The protrusion units 134' may have a height in a range from ½ to 1 times the thickness of the base 132. The protrusion units 134' may be arranged in parallel with each other, towards an air inlet so as to act as an air path. In an example embodiment, the air inlet of a metal-air battery may be defined at the gaps between the protrusion units 134'.

Figure 5:
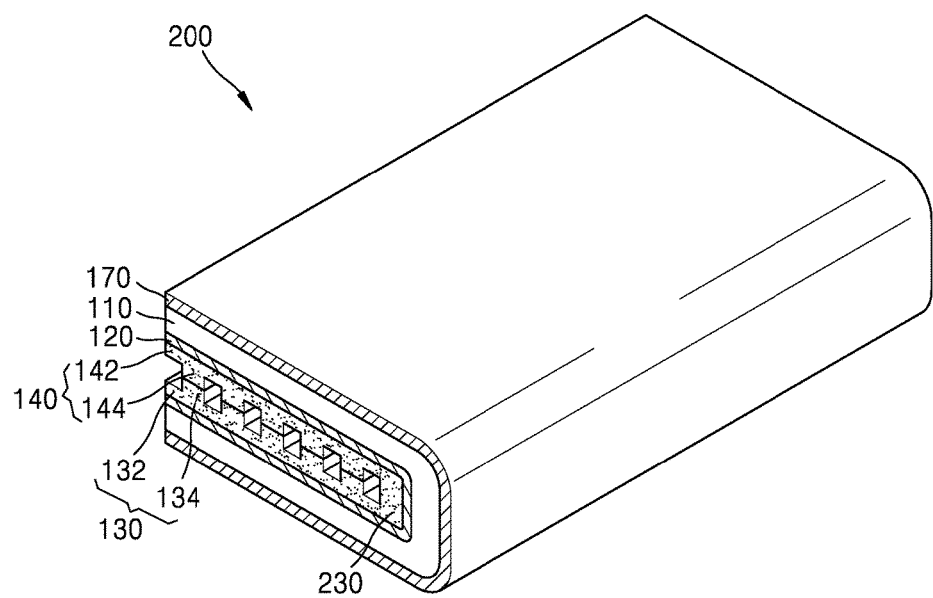
FIG. 5 is a schematic perspective view of a structure of a metal-air battery having a foldable structure according to another example embodiment.

FIG. 5 is a schematic perspective view of a structure of a metal-air battery 200 having a foldable structure according to another example embodiment. Like reference numerals are used to indicate elements that are substantially identical to the elements of FIG. 1, and thus, detailed descriptions thereof will not be repeated.

A connection part 230 is formed between a first cathode 130 and a second cathode 140 on an inner surface of an anode 110. The connection part 230 may have a height equal to a total sum of heights of bases 132 and 142 and protrusion units 134 and 144. In a process of manufacturing the metal-air battery 200, after forming a cathode material layer on the inner surface of the anode 110, when the protrusion units 134 and 144 are formed, the cathode material layer between the first cathode 130 and the second cathode 140 may be the connection part 230. The first cathode 130, the second cathode 140, and the connection part 230 may be formed as one body. One of the first and second cathodes 130 and 140 may extend to define the other one of the first and second cathodes 130 and 140.

Figure 6:
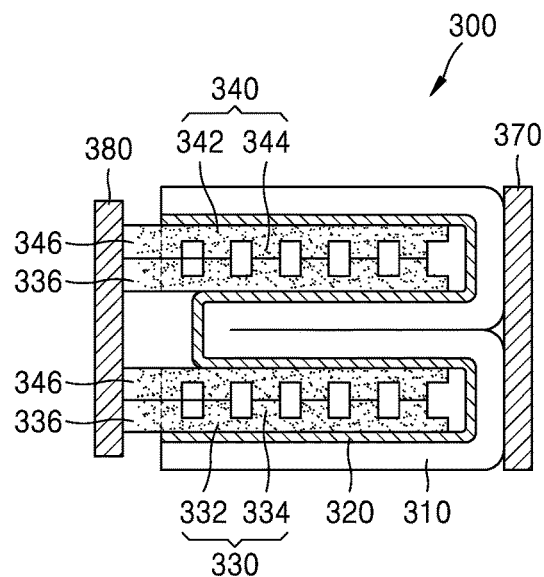
FIG. 6 is a schematic cross-sectional view of a structure of a metal-air battery having a foldable structure according to another example embodiment.

FIG. 6 is a schematic cross-sectional view of a structure of a metal-air battery 300 having a foldable structure according to still another example embodiment. Like reference numerals are used to indicate elements that are substantially identical to the elements of FIG. 1, and thus, detailed descriptions thereof will not be repeated.

The metal-air battery 300 has a structure in which the individual metal-air battery (cell) 100 of FIG. 1 is effectively provided in plurality and vertically stacked in a thickness direction of the folded metal-air battery 300. The individual metal-air batteries 100 and 200 may be referred to as a 1-fold cell and the metal-air battery 300 may be referred to as a 2-fold cell. The metal-air battery 300 includes an anode 310 having a serpentine shape. The anode 310 may include three bent portions arranged in a vertical (thickness) direction of the folded metal-air battery 200. First and third bent portions are disposed at the right in FIG. 6, while a second bent portion is disposed at the left in FIG. 6.

An anode protection film 320 and first and second cathodes 330 and 340 are respectively arranged in the first and third bent portions. The anode portions that form the second bent portion may contact each other by folding against each other.

The first cathode 330 and the second cathode 340 may respectively include extension units 336 and 346 which extend further than the anode 310 and the anode protection film 320, in a side direction of the metal-air battery 300. The extension units 336 and 346 are exposed to the outside of the anode 110 in a top plan view. The extension units 336 and 346 may be connected to a cathode current collector 380. The cathode current collector 380 may be arranged in a perpendicular (thickness) direction with respect to the metal-air battery 300. The cathode current collector 380 may be common to each other extension units 336 and 346.

An anode current collector 370 may be arranged on an outer surface of the first and third bent portions. The anode current collector 370 and the cathode current collector 380 may be arranged to face each other with the main body of the metal-air battery 300 therebetween. The anode current collector 370 may be a relatively thin film including a conductive metal, for example, Cu. As depicted in FIG. 6, the anode current collector 370 may extend in a direction perpendicular to layer extension directions of the anode 310, the anode protection film 320, and the first and second cathodes 330 and 340. The anode current collector 370 extends along a (thickness) direction perpendicular to the layer directions without bending, regardless of the number of folded cells. Thus, a material for forming the anode current collector 370 may be minimized and a ratio of the anode current collector 370 in the metal-air battery 300 may be reduced.

The metal-air battery 300 according to the example embodiment may have increased energy generation as compared to the 1-fold cell.

In FIG. 6, the metal-air battery 300 having 2-fold cells is depicted. However, the current example embodiment is not limited thereto. For example, a metal-air battery may include a few tens of folded cells which are vertically stacked.

Figure 7:
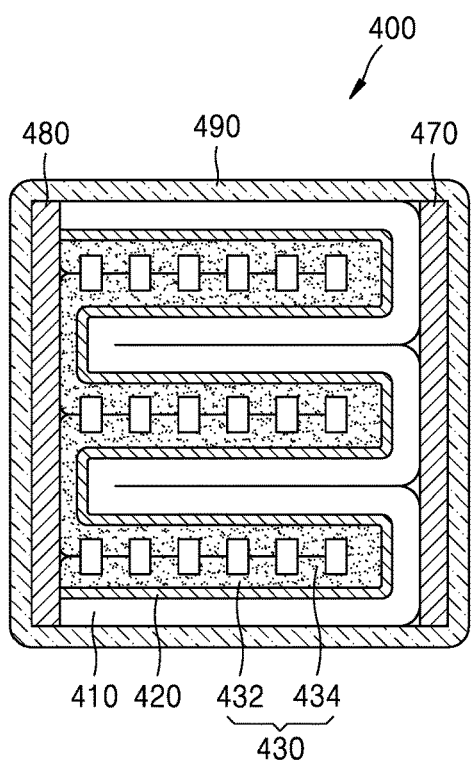
FIG. 7 is a schematic cross-sectional view of a structure of a metal-air battery having a foldable structure according to another example embodiment.

FIG. 7 is a schematic perspective view of a structure of a metal-air battery 400 having a foldable structure, according to still another example embodiment. Like reference numerals are used to indicate elements that are substantially identical to the elements of FIG. 6, and thus, detailed descriptions thereof will not be repeated.

The metal-air battery 400 has a structure in which the individual metal-air battery (cell) 200 of FIG. 5 is effectively provided in plurality and vertically stacked in a thickness direction of the folded metal-air battery 400. Each metal-air battery 200 may be referred to as a 1-fold cell, and the metal-air battery 300 may be referred to as a 3-fold cell. The metal-air battery 400 includes an anode 410 having a serpentine shape. The anode 410 includes five bent portions arranged in a vertical (thickness) direction of the folded metal-air battery 400. First, third and fifth bent portions are disposed at the right in FIG. 7, while second and fourth bent portions are disposed at the left in FIG. 7. An anode protection film 420 and a third cathode 430 are arranged on inner surfaces of odd-numbered bent portions. Portions of the anode protection film 420 that form even-numbered bent portions may be folded without a space therein.

The anode protection film 420 may be consecutively formed on an inner surface of the odd-numbered bent portions of the anode 410. A third cathode 430 is formed on the anode protection film 420. The cathode 430 may be consecutively formed along the anode protection film 420. The anode protection film 420 and the third cathode 430 may each have a serpentine shape. The third cathode 430 includes a protrusion unit 434 provided in plurality on a base 432. The third cathode 430 may include bent portions having the same shape as the anode 410. The third cathode 430 may include portions corresponding to the first cathode 130, the second cathode 140, and the connection part 230 in FIG. 5, and connection portions covering the even-numbered bent portions of the anode protection film 420.

In a top plan view, the third cathode 430 protrudes further from the second and fourth bent portions of the anode 410. The protruding portions of the third cathode 430 at the second and fourth bent portions of the anode 410 may be connected to a cathode current collector 480. The cathode current collector 480 may be perpendicularly arranged with respect to an extension direction of layers within the metal-air battery 400.

An anode current collector 470 may be arranged on an outer surface of the odd-numbered bent portions of the anode 410. The anode current collector 470 and the cathode current collector 480 may be arranged to face each other with the main body of the metal-air battery 400 therebetween.

A top surface, a bottom surface, and three side surfaces of the folded metal-air battery 400 may be surrounded by using a covering material 490, such as a pouch film. That is, five outer surfaces of the metal-air battery 400 except for a front surface may be surrounded by the covering material 490. FIG. 7 represents a view from the front surface of the metal-air battery 400, where top, bottom and two side surfaces are visible. The front surface of the metal-air battery 400 may serve as an air inlet thereof.

When the metal-air battery 400 is surrounded by the covering material 490, the anode current collector 470 and the cathode current collector 480 may be located inside the covering material 490. Since the covering material 490 does not cover the front surface of the metal-air battery 400, the third cathode 430 and the gaps formed therein may be exposed at the front surface of the metal-air battery 400. Accordingly, oxygen may be smoothly supplied to the third cathode 430, e.g., through the gaps formed therein, of the metal-air battery 400, regardless of an increase in the number of individual cells.

The metal-air battery 400 according to the current example embodiment may not need extension units (336 and 346 of FIG. 6) for the cathode current collector 480, and thus, may have a simple manufacturing process and a stable structure as compared to the metal-air battery 300 of FIG. 6.

In the current example embodiment, the metal-air battery 400 is depicted as a 3-fold cell. However, the current example embodiment is not limited thereto. In an embodiment, for example, the metal-air battery 400 may include more than three folded cells such as tens of folded cells.

The metal-air battery according to one or more example embodiment may have relatively high energy density since the metal-air battery includes an air path for efficiently supplying air to a cathode without using a gas diffusion layer.

It should be understood that embodiments described herein should be considered in a descriptive sense only and not for purposes of limitation. Descriptions of features within each embodiment should typically be considered as available for other similar features in other embodiments.

While one or more embodiments have been described with reference to the figures, it will be understood by those of ordinary skill in the art that various changes in form and details may be made therein without departing from the spirit and scope as defined by the following claims.

What is claimed is:

1. A metal-air battery comprising:
   an anode having a U-shape defined by first and second portions separated from and parallel to each other, and a side portion which connects the first and the second portions to each other;
   an anode protection film arranged on an inner surface of the anode; and
   a first cathode and a second cathode on the anode protection film, the first cathode and the second cathode arranged facing each other between the first portion and the second portion of the anode,
   wherein the first cathode and the second cathode each comprises a base which contacts the anode protection film, and a plurality of protrusion units extended from the base.

2. The metal-air battery of claim 1, wherein the plurality of protrusion units of the first cathode respectively contact the plurality of protrusion units of the second cathode.

3. The metal-air battery of claim 2, wherein within the first cathode and the second cathode, respectively, the plurality of protrusion units have a column shape.

4. The metal-air battery of claim 1, wherein within the first cathode and the second cathode, respectively,
   the plurality of protrusion units are arranged spaced apart from each other by a gap, and
   in a direction in which the protrusion units are arranged spaced apart from each other, a width of the protrusion units is greater than the gap.

5. A metal-air battery comprising:
   a plurality of folded cells consecutively stacked,
   wherein each of the plurality of folded cells comprises:
      an anode having a U-shape defined by first and second portions separated from and parallel to each other, and a side portion which connects the first and the second portions to each other;
      an anode protection film arranged on an inner surface of the anode; and
      a first cathode and a second cathode on the anode protection film, the first cathode and the second cathode arranged facing each other between the first portion and the second portion of the anode,
      wherein the first cathode and the second cathode each respectively comprises a base which contacts the anode protection film, and a plurality of protrusion units extended from the base.

6. The metal-air battery of claim 5, wherein the plurality of protrusion units of the first cathode respectively contact the plurality of protrusion units of the second cathode.

7. The metal-air battery of claim 6, wherein within the first cathode and the second cathode, respectively, the plurality of protrusion units have the same shape as each other.

8. The metal-air battery of claim 6, wherein within the first cathode and the second cathode, respectively, the plurality of protrusion units have a column shape.

9. The metal-air battery of claim 8, wherein within the first cathode and the second cathode, respectively,
   the plurality of protrusion units are arranged spaced apart from each other by a gap, and
   in a direction in which the protrusion units are arranged spaced apart from each other, a width of the protrusion units is greater than the gap.

10. The metal-air battery of claim 6, wherein within the first cathode and the second cathode, respectively, the plurality of protrusion units have a stripe shape.

11. The metal-air battery of claim 10, wherein within the first cathode and the second cathode, respectively,
    the plurality of protrusion units are arranged spaced apart from each other by a gap, and
    in a direction in which the protrusion units are arranged spaced apart from each other, a width of the protrusion units is greater than the gap.

12. The metal-air battery of claim 10, wherein within the first cathode and the second cathode, respectively, the plurality of protrusion units having the stripe shape are arranged spaced apart from and parallel to each other by a gap, the gap exposed to outside the metal-air battery to form an air inlet for external air.

13. The metal-air battery of claim 5, wherein within each of the plurality of folded cells, the first cathode and the second cathode each extend further than the anode and the anode protection film to define a respective extension unit disposed outside the anode and the anode protection film, and
    the metal-air battery further comprises a cathode current collector which connects the extension units to each other.

14. The metal-air battery of claim 5, wherein
    the anodes of the plurality of folded cells are connected to each other to form a single anode having a serpentine shape,
    the serpentine shape defines:
        a plurality of opening spaces respectively between the first and second portions parallel to each other, the opening spaces being open at a same first side of the single anode, and
        bent portions at a second side of the single anode opposite to the first side thereof, and
    the anode protection films of the plurality of folded cells are connected to each other to form a single anode protection film consecutively formed along an inner surface of the single anode at the opening spaces thereof.

15. The metal-air battery of claim 14, wherein
    the first cathode and the second cathode of the plurality of folded cells are connected to each other to form a third cathode having a serpentine shape on the single anode protection film, and
    the third cathode is exposed outside the single anode and the anode protection film, at the first side of the single anode.

16. The metal-air battery of claim 15, further comprising a cathode current collector disposed at the first side of the single anode, the cathode current collector extending across the opening spaces of the single anode to contact the third cathode at the first side of the single anode.

17. The metal-air battery of claim 16, further comprising an anode current collector disposed at the second side of the single anode, the anode current collector extending across the bent portions of the single anode to contact the bent portions of the single anode at the second side thereof.

18. The metal-air battery of claim 17, wherein the cathode current collector and the anode current collector face each other with the plurality of folded cells therebetween.

19. The metal-air battery of claim 17, wherein the third cathode, the single anode and the anode protection film are exposed outside the metal-air battery at a front surface thereof, further comprising a covering material which surrounds the cathode current collector, the anode current collector and external surfaces of the plurality of folded cells except for the front surface of the metal-air battery.

20. The metal-air battery of claim 5, wherein the anode protection film comprises a polymer electrolyte film having conductivity with respect to metal ions while blocking oxygen.

* * * * *